(12) United States Patent
Kim

(10) Patent No.: US 7,659,948 B2
(45) Date of Patent: Feb. 9, 2010

(54) LIQUID CRYSTAL DISPLAY DEVICE AND DISPLAY APPARATUS HAVING THE SAME INCLUDING REAR CASE AND RECEIVING CONTAINER ATTACHMENT COMBINATION

(75) Inventor: Tae-Joon Kim, Seongnam-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 10/522,704

(22) PCT Filed: Sep. 24, 2003

(86) PCT No.: PCT/KR03/01944

§ 371 (c)(1),
(2), (4) Date: Jan. 28, 2005

(87) PCT Pub. No.: WO2004/029703

PCT Pub. Date: Apr. 8, 2004

(65) Prior Publication Data

US 2006/0055840 A1 Mar. 16, 2006

(30) Foreign Application Priority Data

Sep. 30, 2002 (KR) .................. 10-2002-0059561

(51) Int. Cl.
G02F 1/1333 (2006.01)
(52) U.S. Cl. .................. 349/58; 349/61
(58) Field of Classification Search .................. 349/58, 349/61
See application file for complete search history.

(56) References Cited

U.S. PATENT DOCUMENTS 6,109,948 A * 8/2000 Kuo .................. 439/357
6,501,641 B1 * 12/2002 Kim et al. .................. 361/681
6,828,721 B2 * 12/2004 Wakita .................. 313/491

(Continued)

FOREIGN PATENT DOCUMENTS

CN 2239406 Y 11/1996

(Continued)

OTHER PUBLICATIONS

English Language Abstract, CN Patent First Publication No. CN 2239406A, Nov. 6, 1996, 1 page.

(Continued)

Primary Examiner—David Nelms
Assistant Examiner—Nathanael R Briggs
(74) Attorney, Agent, or Firm—Innovation Counsel LLP

(57) ABSTRACT

The liquid crystal display device includes a back light assembly (200), a receiving container (300) and a liquid crystal display panel (400). The back light assembly (200) generates a first light to transform the first light into a second light having modulated optical characteristics. The receiving container (300) has sidewalls (310) and a bottom face (320). The bottom face (320) includes a combination groove (340) for fixing the liquid crystal display device to an external member. A width of a portion of the combination groove (340) is larger than a width of an entrance of the combination groove (340). The liquid crystal display panel transforms the second light into an image light. The receiving container (300) receives the liquid crystal display panel.

4 Claims, 11 Drawing Sheets

U.S. PATENT DOCUMENTS

| | | |
|---|---|---|
| 2001/0050731 A1 | 12/2001 | An et al. |
| 2002/0054249 A1* | 5/2002 | Ryu et al. ..................... 349/58 |
| 2002/0159001 A1* | 10/2002 | Kim ............................ 349/58 |
| 2003/0063230 A1* | 4/2003 | Kato et al. ................... 349/58 |
| 2005/0168930 A1* | 8/2005 | Kim et al. ................... 361/683 |

FOREIGN PATENT DOCUMENTS

| | | |
|---|---|---|
| CN | 1321910 A | 11/2001 |
| JP | 2001 1147422 A | 5/2001 |
| JP | 2002 182209 A | 6/2002 |

OTHER PUBLICATIONS

English Language Abstract, CN Patent First Publication No. CN 1321910A, Nov. 14, 2001, 1 page.

English Translation of Chinese Patent Office Action, 4 pages.

* cited by examiner

LIQUID CRYSTAL DISPLAY DEVICE AND DISPLAY APPARATUS HAVING THE SAME INCLUDING REAR CASE AND RECEIVING CONTAINER ATTACHMENT COMBINATION

TECHNICAL FIELD

The present invention relates to a liquid crystal display device and a display apparatus having the liquid crystal display device, in particular to a liquid crystal display device having an enhanced assembling structure of combining a receiving container and a case, and a display apparatus having the liquid crystal display device.

BACKGROUND ART

Recently, an information processing apparatus has been developed rapidly to have various designs and functions. Further a processing speed of the information processing apparatus has been enhanced. Information processed in the information processing apparatus is an electric signal. Therefore, a display apparatus performing an interface between the information processing apparatus and a user is needed so as to the user may perceive the information.

Nowadays, a liquid crystal display device is widely used as the display apparatus. The liquid crystal display device has many merits such as lightweight, small size and high resolution in comparison with a cathode ray tube (CRT) display device.

The liquid crystal display device may be used as a monitor of a personal computer, a wall-mounted television set, etc.

When electric fields are applied to liquid crystal molecule, an arrangement of the liquid crystal molecule is changed, so that optical characteristics of the liquid crystal are also changed. Therefore, the liquid crystal display device displays an image.

The liquid crystal display device has two different types: a transmissive type liquid crystal display device and a reflective type liquid crystal display device.

The transmissive type liquid crystal display device uses light generated from a lamp so as to display an image. The reflective type liquid crystal display device uses external light so as to display an image.

The transmissive type liquid crystal display device is relatively heavy and large in size; however, the transmissive type liquid crystal display device may be operated without the external light.

FIG. 1 is an exploded perspective view showing a general liquid crystal display device.

Referring to FIG. 1, a liquid crystal display device 100 includes a liquid crystal display module 80 and a case 90 for receiving the liquid crystal display module 80.

The liquid crystal display module 80 includes a display unit 20, a back light assembly 40, a top chassis 50 and a receiving container 60.

The display unit 20 includes a liquid crystal display panel 52, a printed circuit boards 54 and 55, a data tape carrier package 56 and a gate tape carrier package 58.

The liquid crystal display panel 52 includes a thin film transistor substrate 52a, a color filter substrate 52b and liquid crystal (not shown).

The back light assembly 40 is disposed under the display unit 20 to supply the display unit 20 with uniform light. The back light unit 40 includes a lamp cover 41, a lamp 42, a light guide plate 43, optical sheets 45 and a reflection plate 44.

The light guide plate 43 is disposed under the liquid crystal display panel 52. The light guide plate 43 has substantially same size as the liquid crystal display panel 52. The light guide plate 43 changes a path of light generated from the lamp 42 to guide the light toward the display unit 20.

The optical sheets 43 are disposed over light guide plate 43. The optical sheets modulate light that exits from the light guide plate 43 and advances toward the liquid crystal display panel 52 to make the light uniform.

The reflection plate 44 is disposed under the light guide plate 43. The reflection plate 44 reflects light leaked from the light guide plate 43 toward the light guide plate 43, so that light-using efficiency is enhanced.

The receiving container 60 has a hexagonal box shape. An upper face of the receiving container 60 has an open top, so that the receiving container 60 has substantially four sidewalls and a bottom face.

The top chassis 50 has a hexagonal box shape. An upper face of the receiving container 60 has opening for exposure of the liquid crystal display panel 52. Sidewalls of the top chassis 50 are bent, so that the top chassis 50 is combined with the receiving container 60.

FIG. 2 is an exploded perspective view showing a combined structure of a liquid crystal display module and a case;

Referring to FIG. 2, a plurality of protrusion portion 70 protrudes from two sidewalls of the top chassis 50. The two sidewalls of the top chassis 50 face each other. The top chassis 50 is combined with the case 90 via the protrusion portion 70. The protrusion portion 70 has a hole 72.

A lower face of the case 90 has nut portion 92 at a position corresponding to the hole 72 of the protrusion portion 70.

A bolt 74 combines the protrusion portion 70 with the nut portion 92, so that the top chassis 50 is combined with the case 90.

The general liquid crystal display device 100 needs the protrusion portion 70 for combining the top chassis 50 with the case 90, so that a width of the case 90 is increased due to a first width W that is substantially equal to a second width of the protrusion portion 70.

Therefore, a size of the liquid crystal display device 100 is increased.

DISCLOSURE OF THE INVENTION

In one aspect of the present invention, a liquid crystal display device having reduced size is provided.

In another aspect of the present invention, a display apparatus having reduced size is provided.

The liquid crystal display device includes a back light assembly, a receiving container and a liquid crystal display panel. The back light assembly generates a first light to transform the first light into a second light having modulated optical characteristics. The receiving container has sidewalls and a bottom face. The bottom face includes a combination groove for fixing the liquid crystal display device to an external member. A width of a portion of the combination groove is larger than a width of an entrance of the combination groove. The liquid crystal display panel transforms the second light into an image light. The receiving container receives the liquid crystal display panel.

The display apparatus includes a back light assembly, a receiving container, a liquid crystal display panel, a case and a coupling member. The back light assembly generates a first light to transform the first light into a second light having modulated optical characteristics. The receiving container has first sidewalls and a first bottom face. The bottom face includes a combination groove for fixing the liquid crystal display device to an external member. A width of a portion of the combination groove is larger than a width of an entrance of the combination groove. The liquid crystal display panel transforms the second light into an image light. The receiving container receives the liquid crystal display panel. The case includes a front case and a rear case. The rear case includes second sidewalls and a second bottom face. The rear case receives the receiving container. The rear case is combined with the front case. The coupling member combines the receiving container with the rear case. The coupling member is formed at the first bottom face of the receiving container and the second bottom face of the rear case.

When the protrusion of the rear case and the combination groove of the liquid crystal display device combine the liquid crystal display device with the rear case, a width of the monitor device is reduced and the liquid crystal display device may be easily and tightly combined with the rear case.

BRIEF DESCRIPTION OF THE DRAWINGS

The above and other advantages of the present invention will become readily apparent by reference to the following detailed description when considered in conjunction with the accompanying drawings wherein.

BEST MODE FOR CARRYING OUT THE INVENTION

Hereinafter, the preferred embodiment of the present invention will be described in detail with reference to the accompanying drawings.

Embodiment 1

Figure 1:
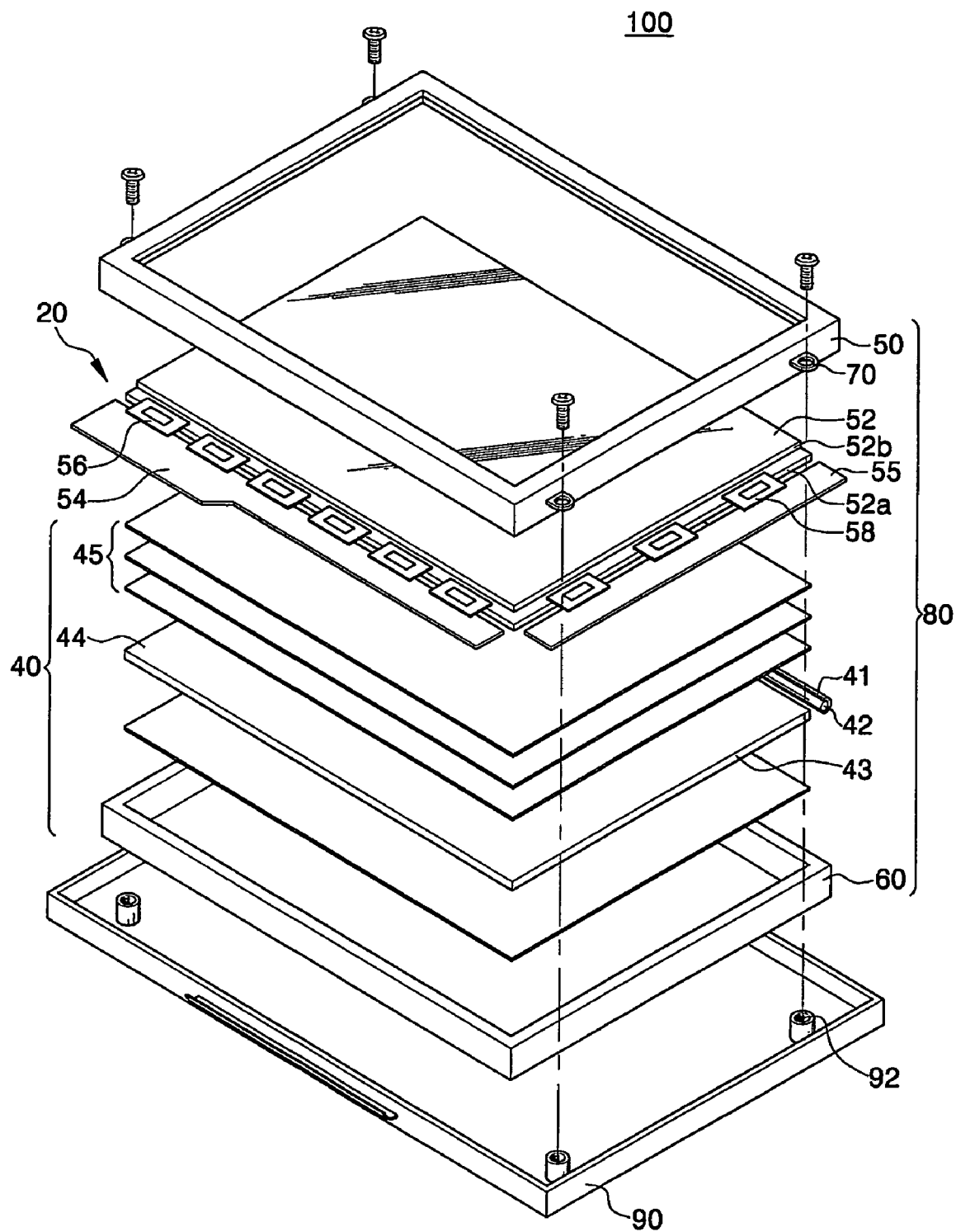
FIG. 1 is an exploded perspective view showing a general liquid crystal display device.
Figure 2:
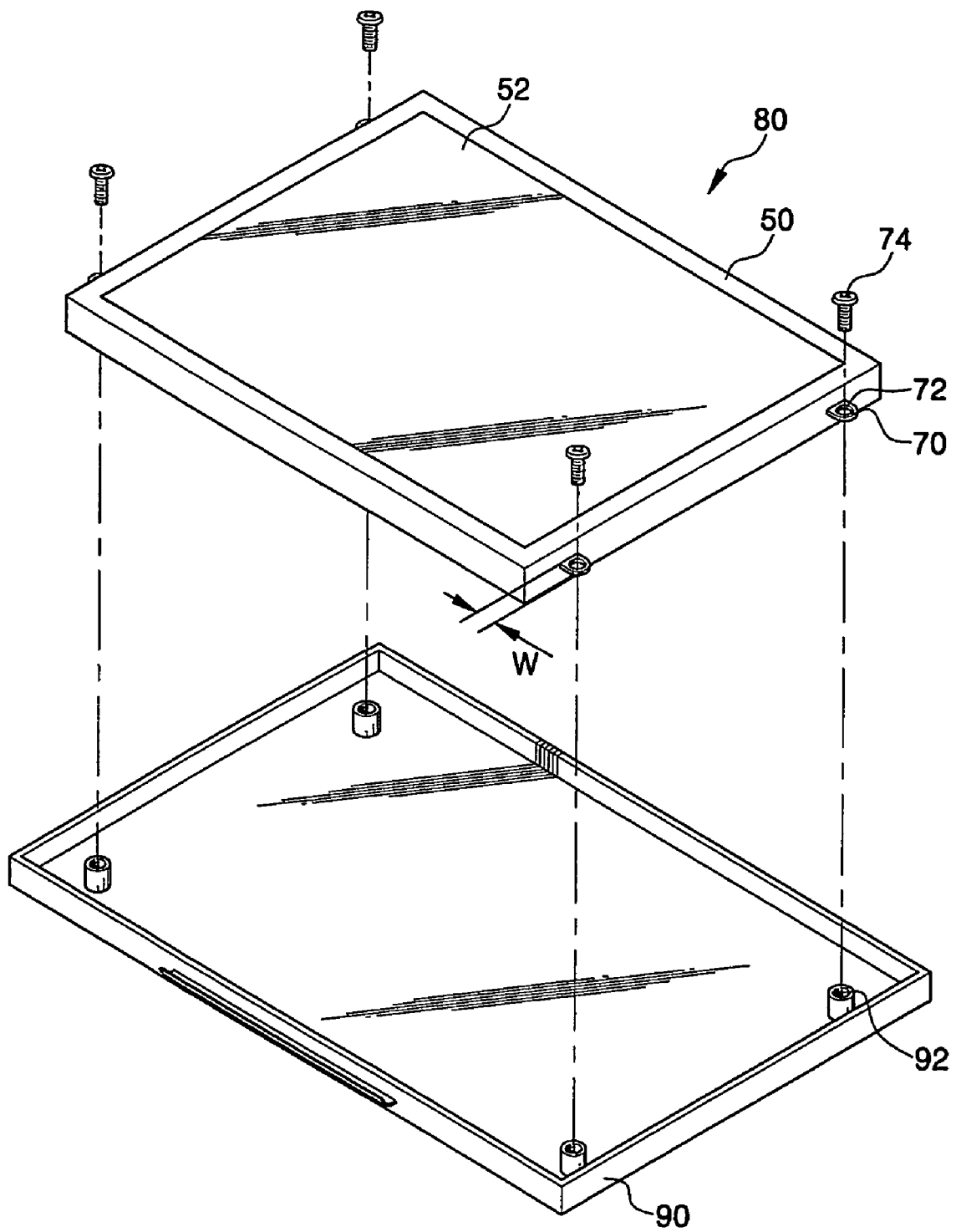
FIG. 2 is an exploded perspective view showing a combined structure of a liquid crystal display module and a case.
Figure 3:
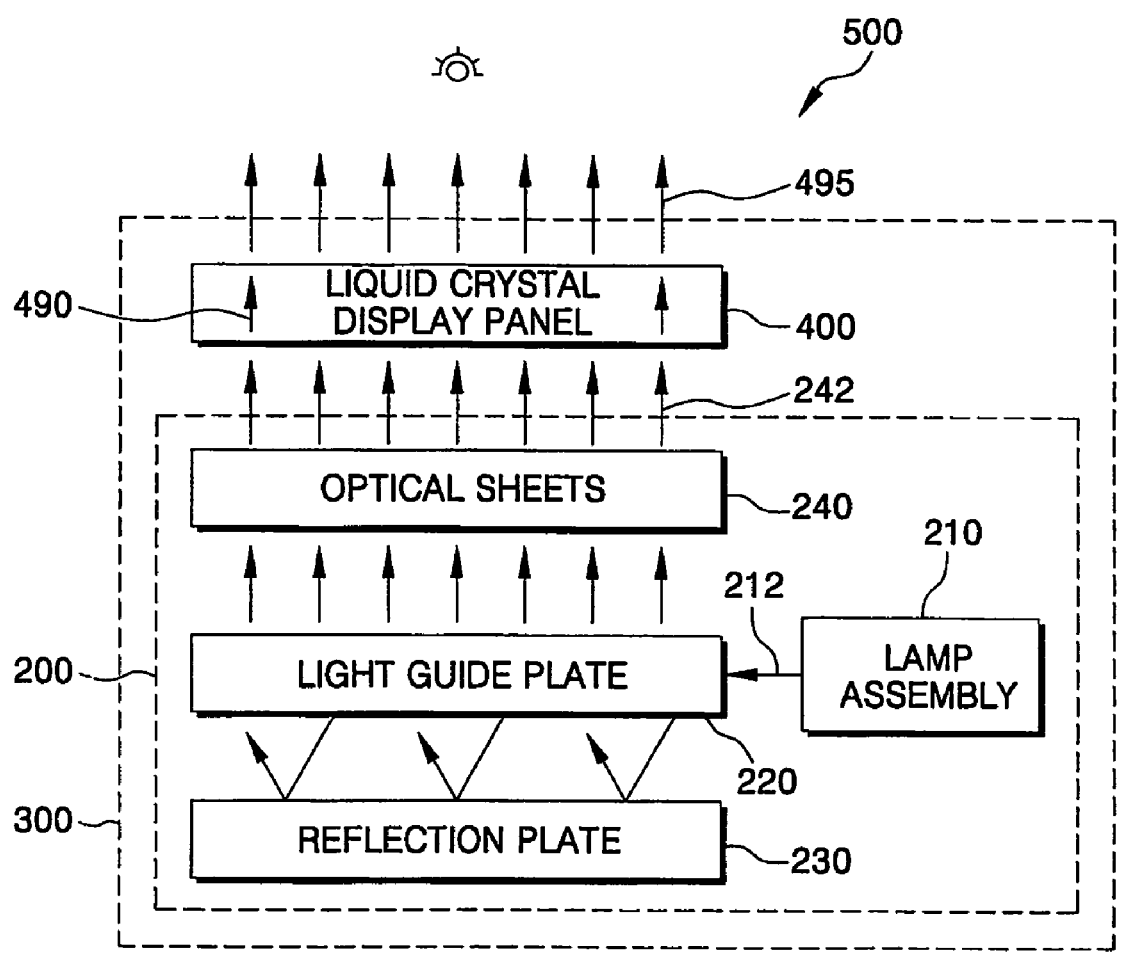
FIG. 3 is a schematic view showing a liquid crystal display device according to a first exemplary embodiment of the present invention.
Figure 4:
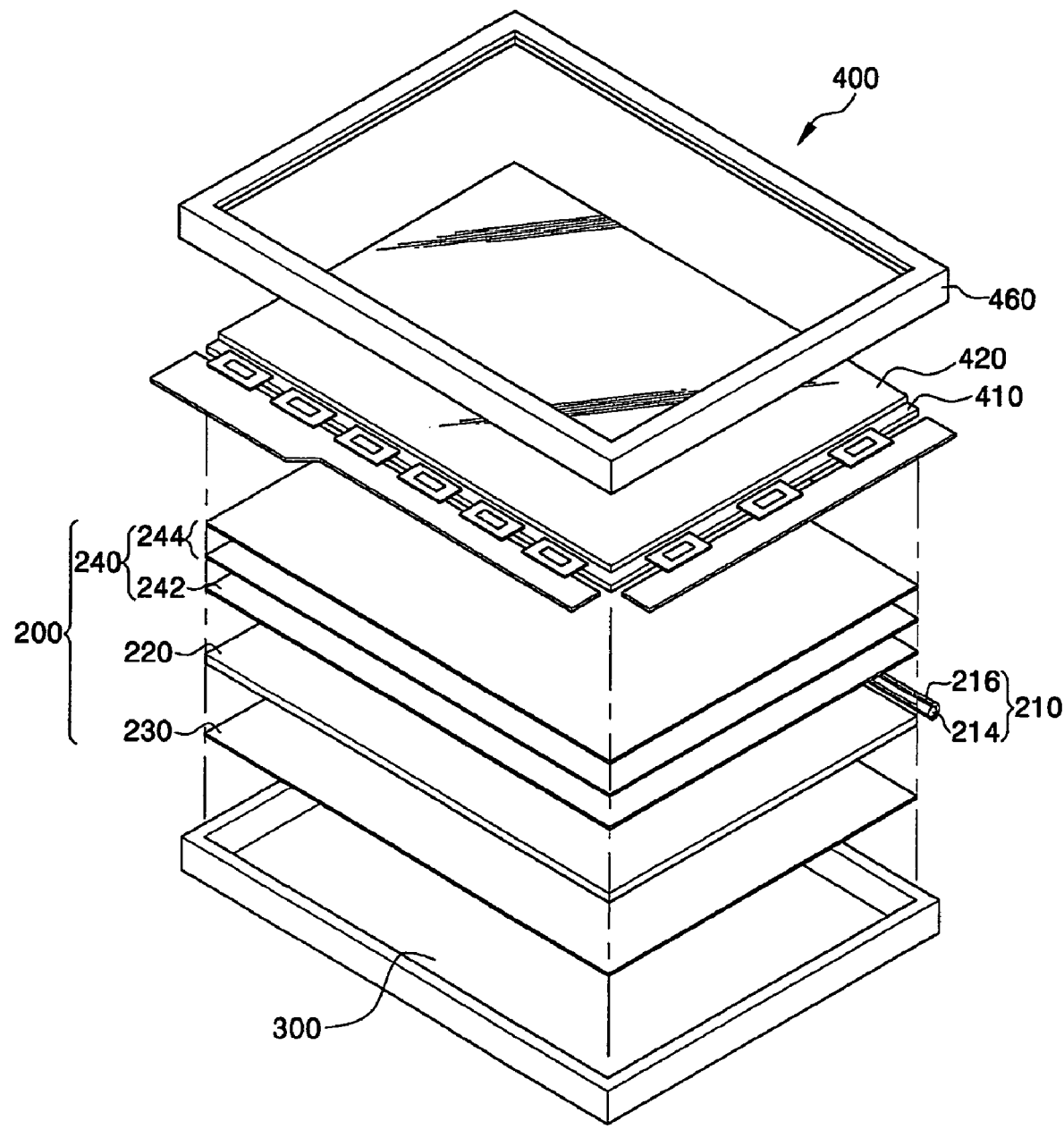
FIG. 4 is an exploded perspective view showing a liquid crystal display device of FIG. 3.

FIG. 3 is a schematic view showing a liquid crystal display device according to a first exemplary embodiment of the present invention, and FIG. 4 is an exploded perspective view showing a liquid crystal display device of FIG. 3.

Referring to FIG. 3, a liquid crystal display device 500 according to a first embodiment of the present invention includes a back light assembly 200, a receiving container 300 and a liquid crystal display panel assembly 400.

The back light assembly 200 includes a lamp assembly 210, a light guide plate 220, a reflection plate 230 and optical sheets 240.

The lamp assembly 210 generates a first light 212 for displaying an image.

Referring to FIG. 4, the lamp assembly 210 includes a lamp 214 and a lamp reflector 216. A cold cathode fluorescent lamp may be used as the lamp 214. The cold cathode fluorescent lamp generates white light and small amount of heat. The cold cathode fluorescent lamp has a long life span.

The lamp reflector 216 reflects a light generated from the lamp 214 toward the light guide plate 220.

The first light 212 enters into the optical sheets 240 via the light guide plate 220, so that the first light 212 is transformed into a second light 242 having improved optical characteristics.

The light guide plate 220 comprises acryl resin. The light guide plate 220 is divided into two different types: a flat type light guide plate and a wedge type light guide plate. The light guide plate 220 transforms one-dimensional light (a light generated from a linear light source) generated from the lamp 214 into two-dimensional light (a light similar to that generated a surface light source). The light guide plate 220 also changes a path of the first light 212.

The optical sheets 240 are disposed over the light guide plate 220. The optical sheets 240 may include a diffusion sheet 242, a prism sheet 244 and luminance enhancement film (not shown).

The optical sheets 240 transform the first light 212 into the second light 242 having enhanced optical characteristics, a luminance, an advancing direction and a light distribution of light.

The reflection sheet 230 is disposed under the light guide plate 220. That is, the light guide plate 220 is disposed over the reflection sheet 230 and the optical sheets 240 are disposed over the light guide plate 220.

The reflection sheet 230 reflects the light leaked from the light guide plate 220 toward the light guide plate 220.

Figure 5:
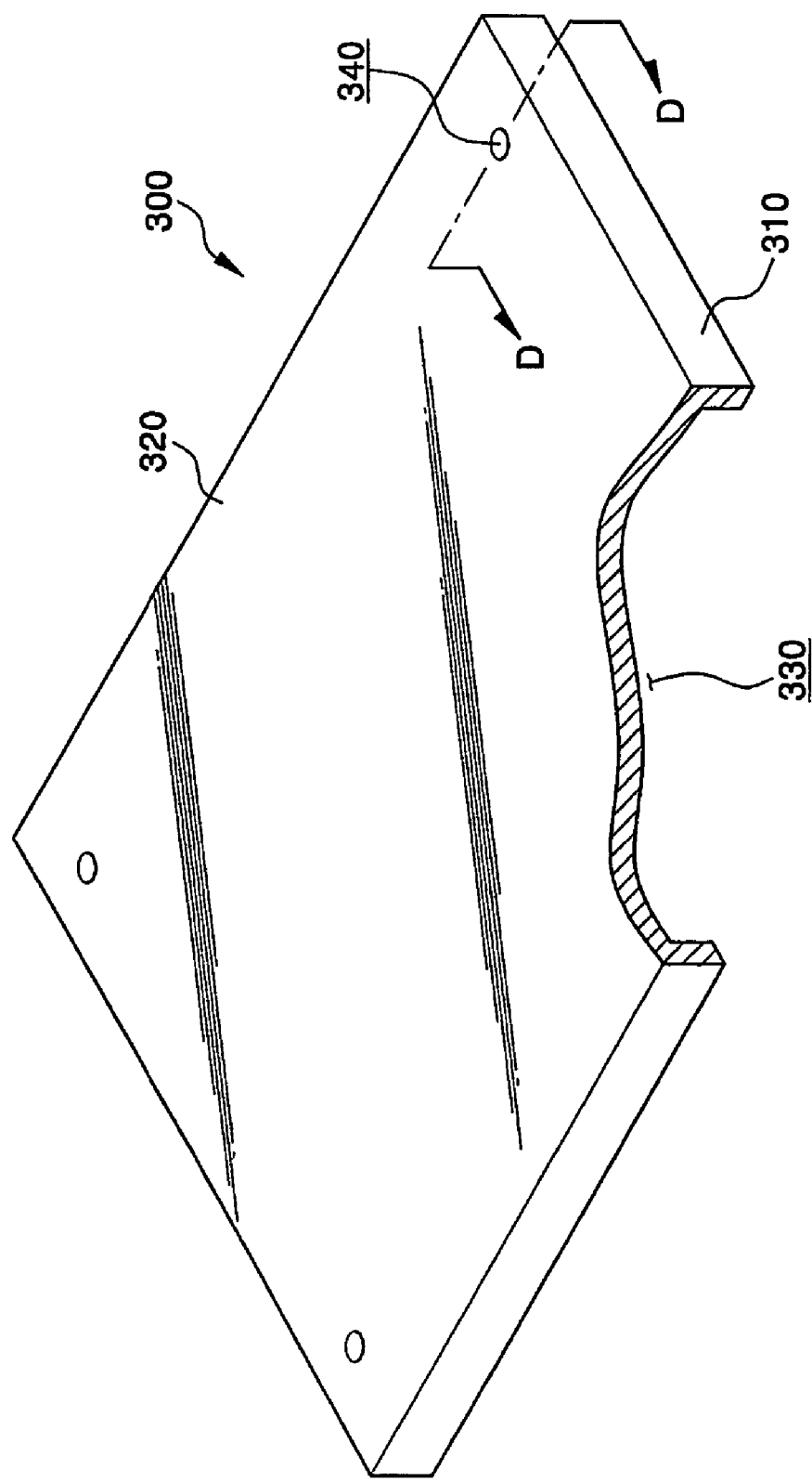
FIG. 5 is a perspective view showing a receiving container of FIG. 3.

FIG. 5 is a perspective view showing a receiving container of FIG. 3.

Referring to FIGS. 4 and 5, a receiving container 300 receives a back light assembly 200. The receiving container 300 is combined with a case (not shown).

The receiving container 300 has sidewalls 310 and a bottom face 320. The sidewalls 310 protrude from the bottom face 320. The sidewalls 310 and the bottom face 320 form a receiving space 330.

The receiving space 330 of the receiving container 300 receives a reflection plate 230, a light guide plate 220, a lamp assembly 210 and optical sheets in sequence.

A connection groove 340 for connecting the receiving container with other member is formed at an outer portion of the bottom face 320 of the receiving container 300.

Figure 6:
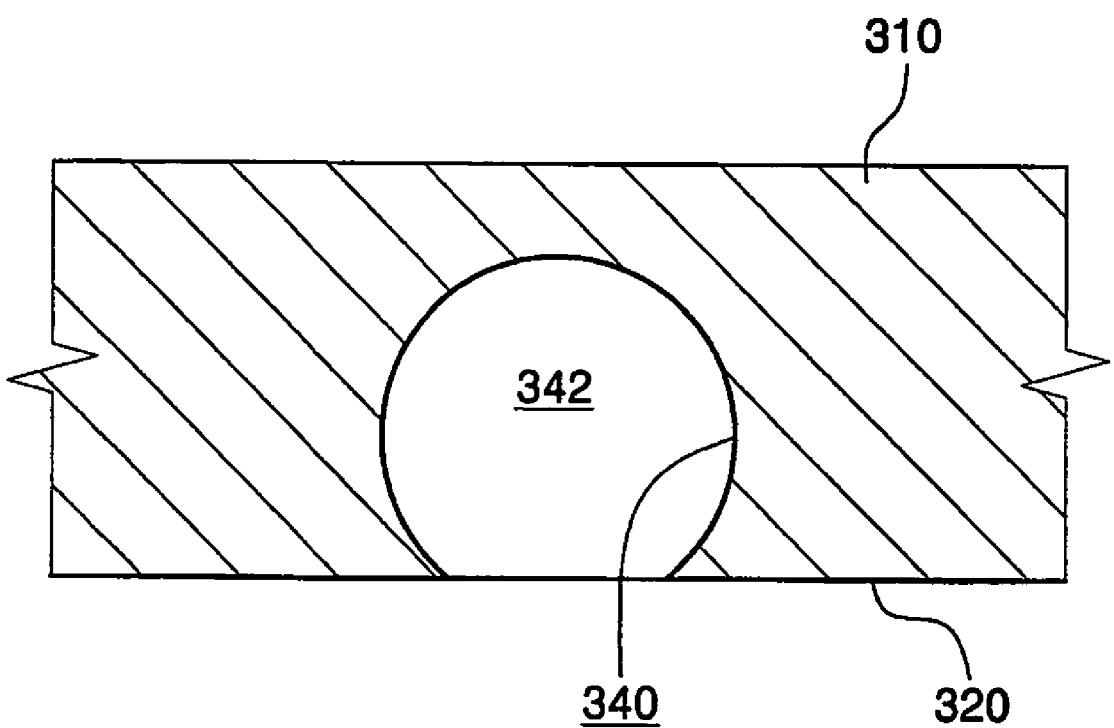
FIG. 6 is a cross-sectional view taken along a line D-D' of FIG. 5.

FIG. 6 is a cross-sectional view taken along a line D-D' of FIG. 5.

Referring to FIG. 6, a width of a portion of the combination groove is larger than a width of an entrance of the combination groove. For example, the connection groove 340 has spherical internal space 342.

The receiving container 300 is combined with other member when a protrusion portion of the member is inserted into the connection groove 340.

For example, the receiving groove 340 is formed at four corner portions of the bottom face 320 of the receiving container 300.

Referring again to FIGS. 4 and 5, the receiving space 330 receives the liquid crystal display panel assembly 400. The receiving space 330 is disposed over the optical sheets 240.

Referring again to FIG. 3, the liquid crystal display panel assembly 400 modulates a transmissivity of a second light 242 of a minute region, so that the second light 242 is transformed into a third light 490. Therefore, an intensity of the third light 490 has different intensity according to a region of the liquid crystal display panel assembly 400. The transmissivity of the second light 242 is modulated by the liquid crystal.

Referring again to FIG. 4, the liquid crystal display panel assembly 400 includes a thin film transistor substrate 410, a color filter substrate 420 and liquid crystal (not shown) interposed between the thin film transistor substrate 410 and the color filter substrate 420.

Figure 7:
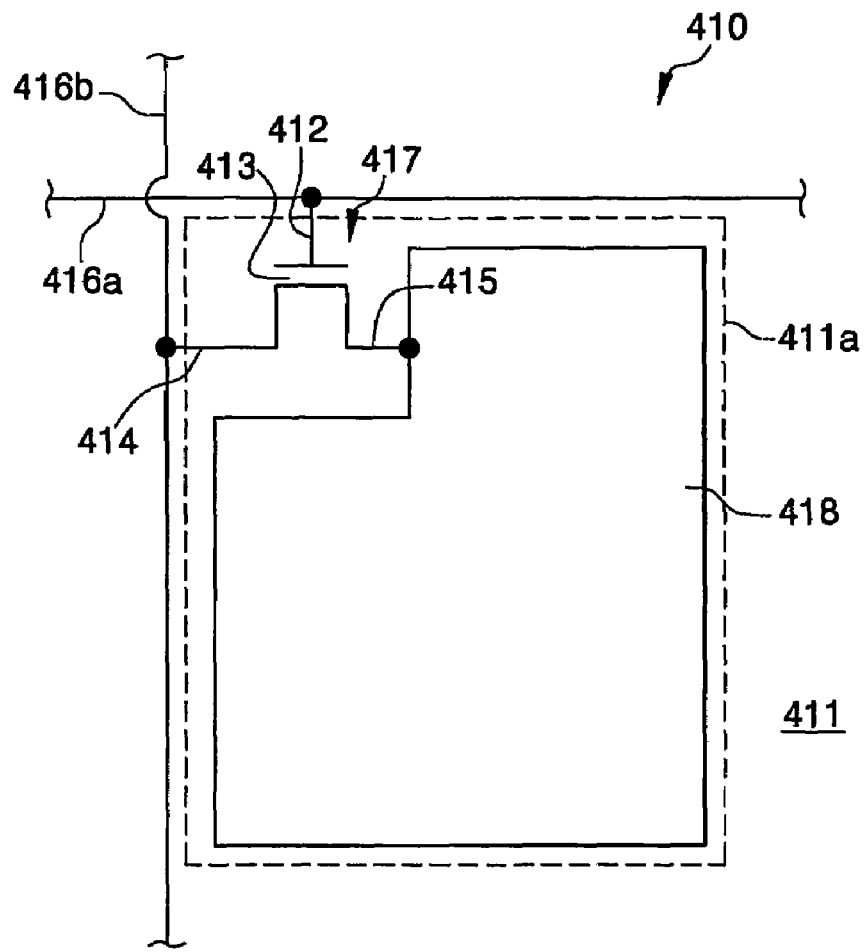
FIG. 7 is a schematic view showing a pixel of a thin film transistor substrate of FIG. 3.

FIG. 7 is a schematic view showing a pixel of a thin film transistor substrate of FIG. 3.

Referring to FIG. 7, a thin film transistor substrate 410 includes a first transparent substrate 411, a thin film transistor 417 and a pixel electrode 418.

A plurality of pixel region 411a is formed on the first transparent substrate 411. A count of pixels is related with a resolution. For example, when the resolution is 860×600, the count of the pixel is 860×600×3. Each of the pixel regions 411a includes a thin film transistor 417.

The thin film transistor 417 includes a gate electrode 412, a channel layer 413, a source electrode 414, a drain electrode 415, a portion of a gate line 416a and a portion of data line 416b.

Each of the pixel regions 411a includes the pixel electrode 418. The pixel electrode 418 is electrically connected with the drain electrode 415 of the thin film transistor 417. The pixel electrode 418 includes indium tin oxide (ITO) or indium zinc oxide (IZO). The indium tin oxide and the indium zinc oxide are transparent and electrically conductive.

Figure 8:
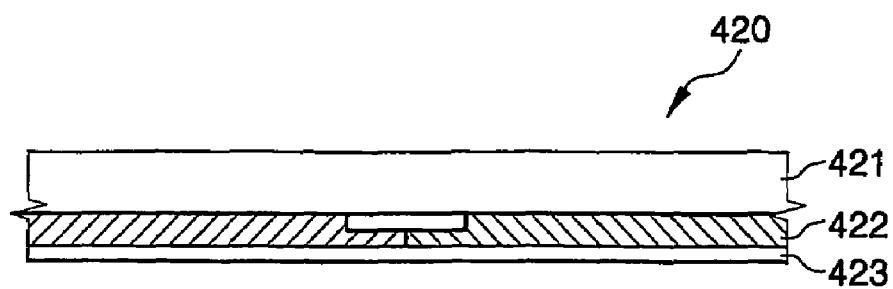
FIG. 8 is a cross-sectional view showing a portion of a color filter unit cell of a color filter unit cell of FIG. 3.

FIG. 8 is a cross-sectional view showing a portion of a color filter unit cell of a color filter unit cell of FIG. 3.

Referring to FIG. 8, a color filter substrate 420 includes a second transparent substrate 421, a color filter 422 and a common electrode 423.

The color filter 422 is formed on the second transparent substrate 421. The color filter 422 has one-to-one correspondence with the pixel electrode 418 of the thin film transistor substrate 410 of FIG. 7.

The common electrode 423 is formed on the color filter 422. The common electrode 423 covers the color filter 422.

Referring to FIGS. 3, 4, 7 and 8, liquid crystal (not shown) is interposed between the thin film transistor substrate 410 and the color filter substrate 420. Electric field is formed between the pixel electrode 418 of the thin film transistor substrate 410 and the common electrode 423 of the color filter substrate 420, so that an arrangement of the liquid crystal molecule is changed. Therefore, the first light 212 is changed into the second light 242.

The color filter 422 of the color filter substrate 420 filters the third light 490, so that an image light 495 exits from the liquid crystal display panel assembly 400.

Therefore, a user may recognize an image 495.

The top chassis 460 presses an edge of the liquid crystal display panel assembly 400, and the top chassis 460 is combined with the receiving container 300. Thus, the liquid crystal display panel assembly 400 is fixed.

Embodiment 2

Figure 9:
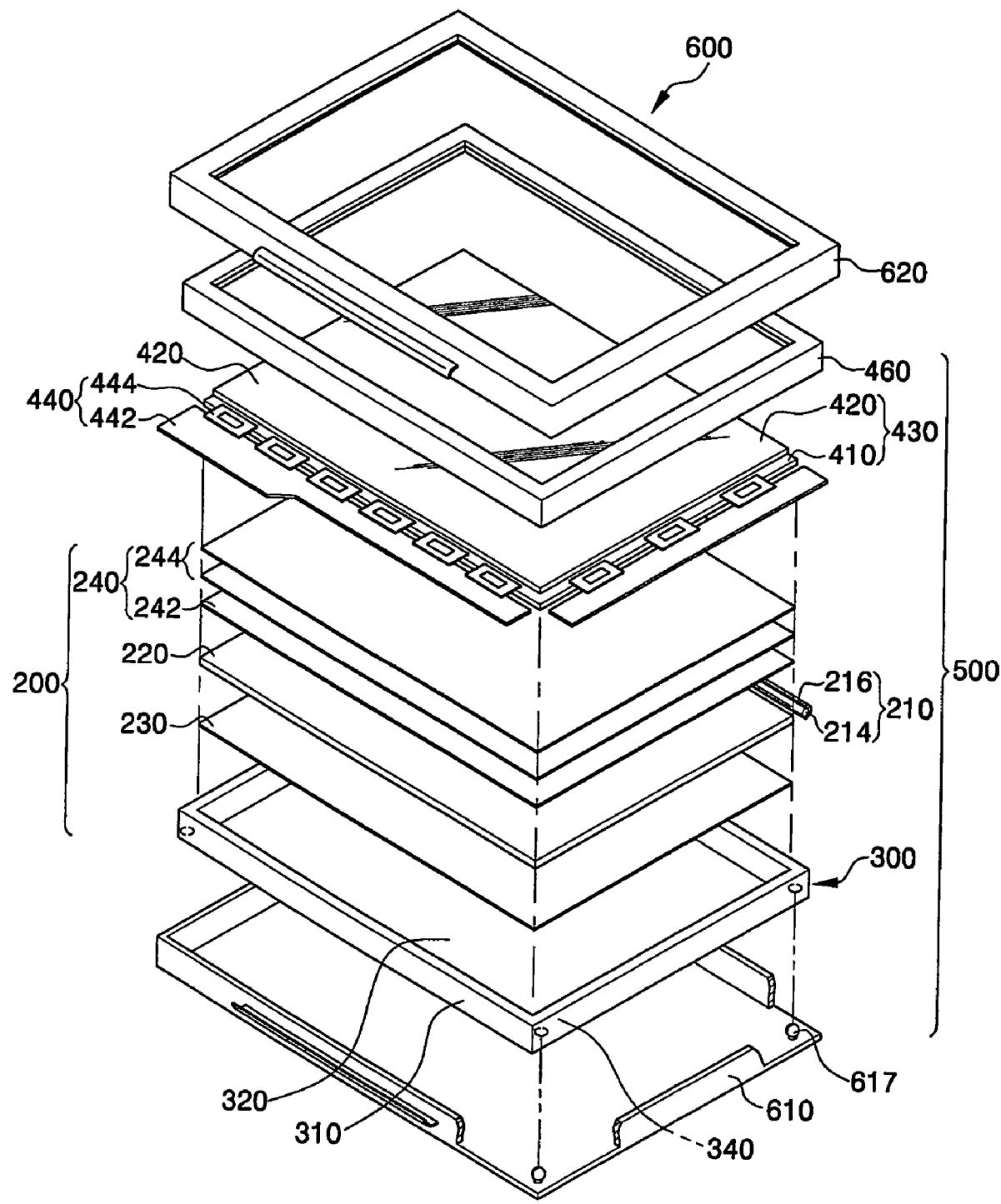
FIG. 9 is an exploded perspective view showing a monitor device according to a second exemplary embodiment of the present invention.

FIG. 9 is an exploded perspective view showing a monitor device according to a second embodiment of the present invention.

A display apparatus includes a monitor device.

Referring to FIG. 9, a monitor device 800 according to a second embodiment of the present invention includes a liquid crystal display device 500 and a case 600.

The case 600 receives the liquid crystal display device 500.

The liquid crystal display device 500 includes a back light assembly 200, a container 300 and a liquid crystal display panel assembly 400.

The back light assembly 200 includes a lamp assembly 210, a light guide plate 220, optical sheets 240 and a reflection plate 230.

The liquid crystal display panel assembly 400 includes a liquid crystal display panel 430 and a driving module 440.

The liquid crystal display panel 430 includes a thin film transistor substrate 410, liquid crystal (not shown) and a color filter substrate 420.

The driving module 440 includes a printed circuit board (PCB) 442 and a tape carrier package (TCP) 444. The tape carrier package 444 connects the printed circuit board 442 with the thin film transistor substrate 420.

The receiving container 300 includes sidewalls 310 and a bottom face 320 so as to receive the back light assembly 200.

For example, a bottom face 320 has a rectangular shape. The sidewalls 310 protrude from an edge portion of the bottom face 320. Therefore, a number of the sidewalls 310 is four. The sidewalls 310 form a right angle with respect to the bottom face 320. The sidewalls 310 and the bottom face 320 form a receiving space.

The receiving container 300 has a connection groove 340, so as to be combined with the case 600.

The connection groove 340 is formed at corners of the bottom face 320 of the receiving container 300, so that the number (or count) of the connection groove 340 is four.

A width of a portion of the combination groove is larger than a width of an entrance of the combination groove. For example, the connection groove 340 has spherical internal space 342.

The receiving space 300 receives the back light assembly 200 and the liquid crystal display panel assembly 400. The case 600 receives the liquid crystal display device 500.

The case 600 includes a front case 620 and a rear case 610. The front case 620 is disposed over the liquid crystal display device 500. The front face 620 has an opening, so that an image light passes through the opening of the front face 620.

The rear case 610 receives the liquid crystal display device 500. The rear case 610 is combined with the front case 620.

Preferably, the liquid crystal display device 500 is combined with the rear case 610 strongly.

When the liquid crystal display device 500 is not tightly combined with the rear case 610, the liquid crystal display device 500 floats inside of the rear case 610, so that the liquid crystal display device 500 may be damaged.

Figure 10:
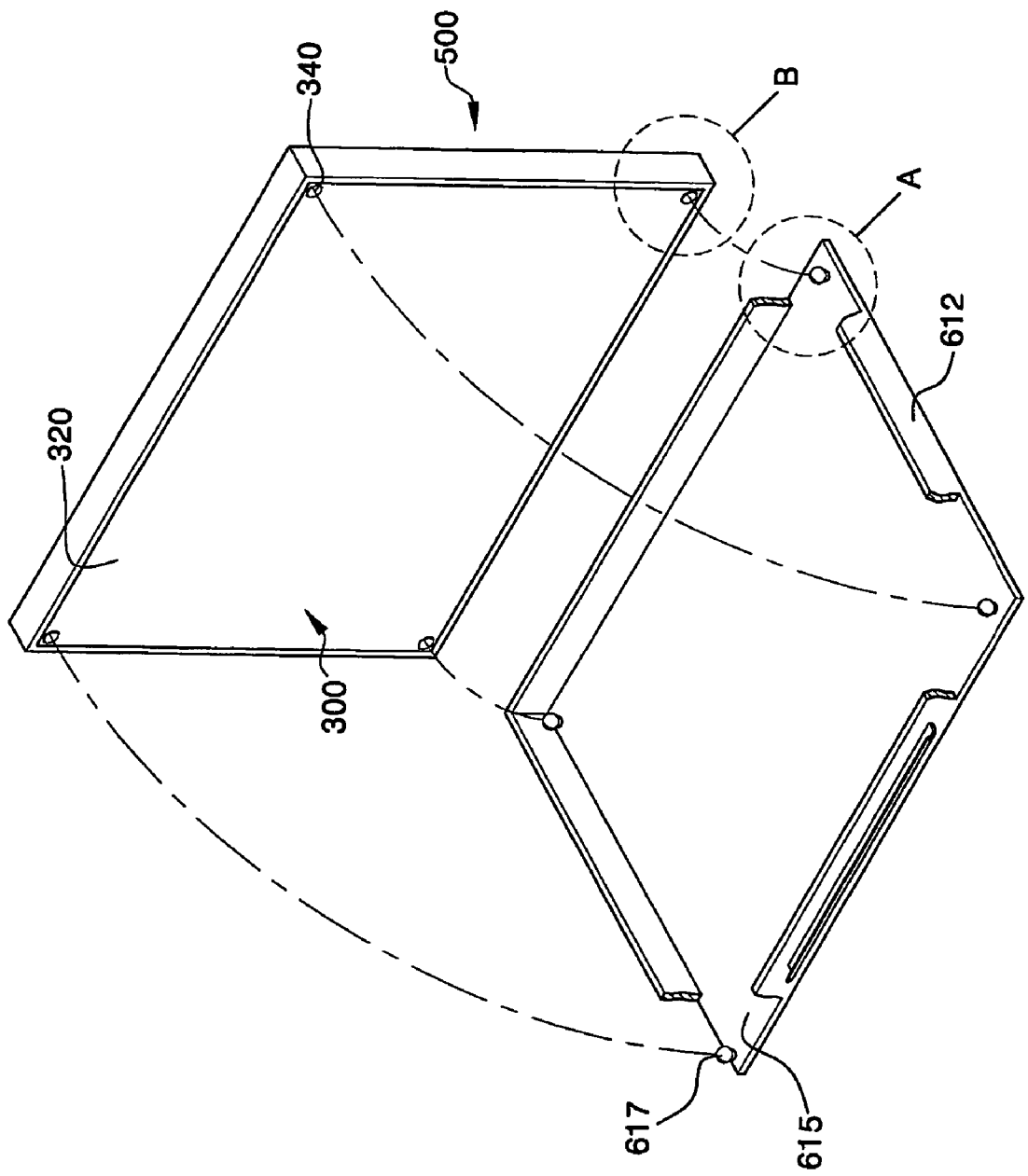
FIG. 10 is an exploded perspective view showing a rear case of FIG. 9.
Figure 11:
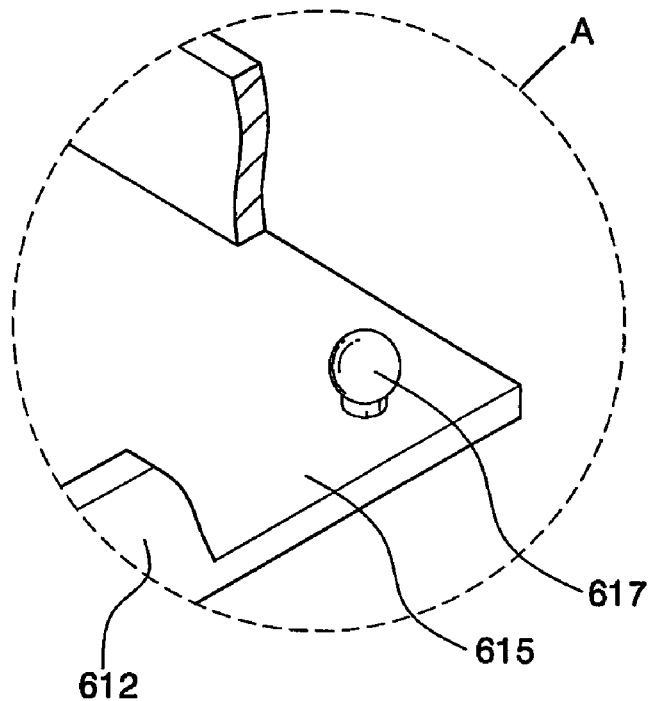
FIG. 11 is an enlarged view showing a portion 'A' of FIG. 10.
Figure 12:
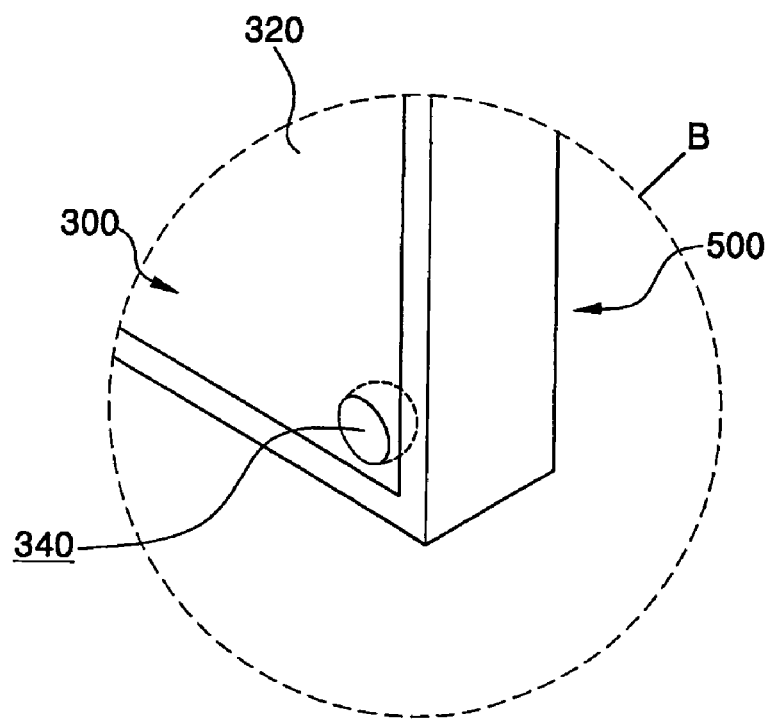
FIG. 12 is an enlarged view showing a portion 'B' of FIG. 10.
Figure 13:
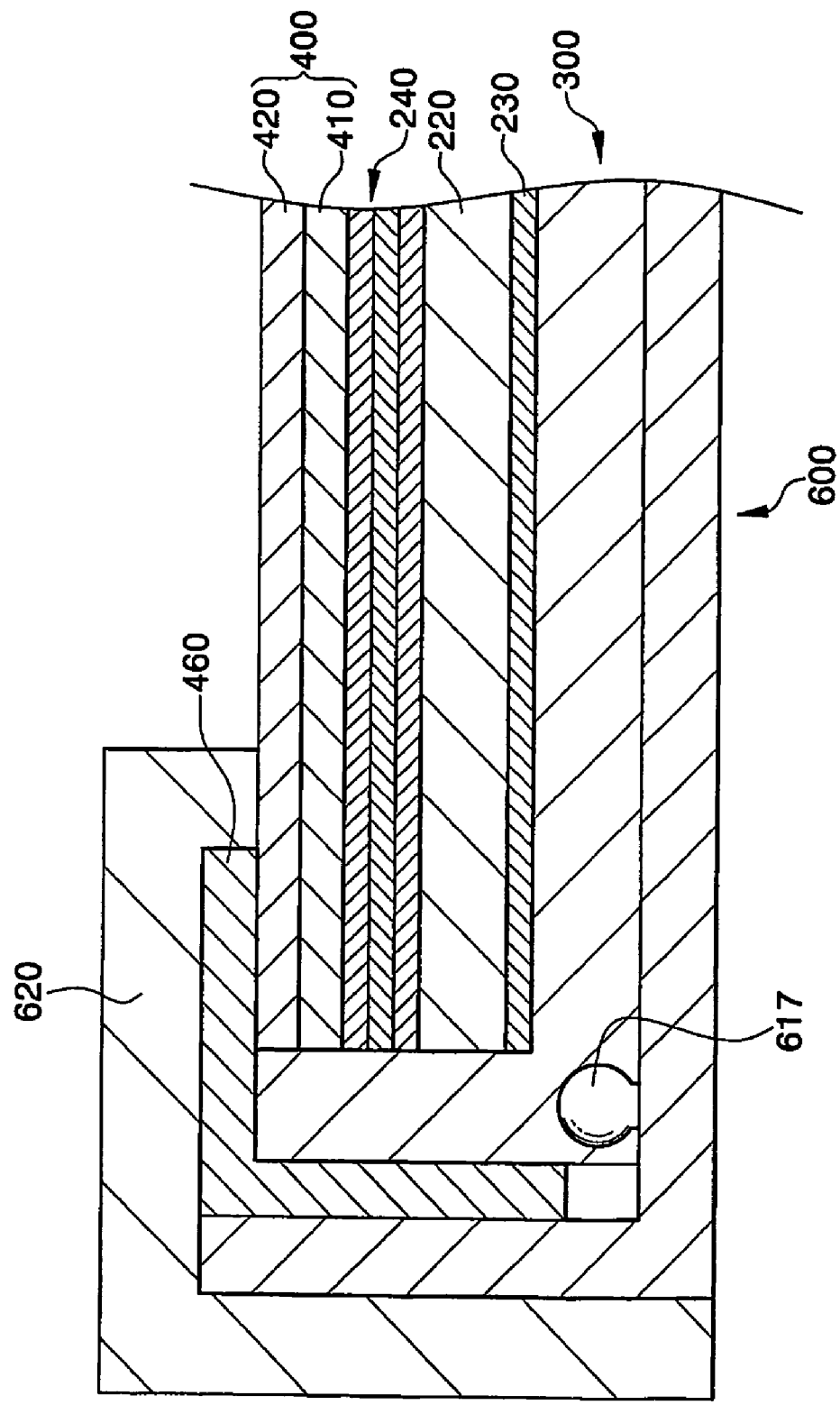
FIG. 13 is a cross-sectional view showing the monitor device of FIG. 9.

FIG. 10 is an exploded perspective view showing a rear case of FIG. 9. FIG. 11 is an enlarged view showing a portion 'A' of FIG. 10, and FIG. 12 is an enlarged view showing a portion 'B' of FIG. 10. FIG. 13 is a cross-sectional view showing the monitor device of FIG. 9.

Referring to FIGS. 9 and 10, a rear case 610 includes sidewalls 612 and a bottom face 615. The bottom face 615 includes a protrusion 617.

The protrusion portion 617 prevents the rear case 610 and the liquid crystal display device 500 from floating. Further, the protrusion portion 617 reduces a number of processes for combining of the rear case 610 and the liquid crystal display device 500. The protrusion portion 617 reduces a number of processes for separating the liquid crystal display device 500 from the rear case 610. The liquid crystal display device 500 may be easily combined with or separated from the rear case 610.

The protrusion 617 is formed at a region corresponding the combination groove 340 of the bottom face 320 in the receiving container 300. Four protrusion portions 617 are formed in accordance with the combination groove 340.

The protrusion 617 may be formed separately from the rear case 610 to be combined with the rear case 610. The protrusion 617 may be integrally formed with the rear case 610.

The protrusion 617 has a shape corresponding to the shape of the combination groove 340.

For example, when the internal space of the combination groove 340 has a spherical shape, the protrusion 617 also has a spherical shape. Therefore, when the protrusion 617 is inserted into the combination groove 340, the liquid crystal display device 500 is tightly combined with the rear case 610.

When a marginal space formed between the protrusion 617 and the combination groove 340 is large, the liquid crystal display device 500 floats. Therefore, the protrusion 617 is formed, such that the marginal space is small.

A position of the protrusion 617 of the rear case 610 and the combination groove 340 of the receiving container 300 may be changed. For example, the protrusion 617 may be formed on the bottom face 320 of the receiving container 300, and the rear case may include a combination groove 340.

INDUSTRIAL APPLICABILITY

When the protrusion of the rear case and the combination groove of the liquid crystal display device combine the liquid crystal display device with the rear case, a width of the monitor device is reduced and the liquid crystal display device may be easily and tightly combined with the rear case.

Although the exemplary embodiments of the present invention have been described, it is understood that the present invention should not be limited to these exemplary embodiments but various changes and modifications can be made by one ordinary skilled in the art within the scope of the present invention as hereinafter claimed.

The invention claimed is:

1. A liquid crystal display device comprising:
   a liquid crystal panel;
   a back light assembly that generates a first light to transform the first light into a second light having modulated optical characteristics and to provide the second light to the liquid crystal panel;
   a receiving container having sidewalls and a bottom plate, the bottom plate having a plurality of sockets recessed toward the liquid crystal panel from a bottom surface of the bottom plate, the sockets each having different diameters including a smaller diameter entrance portion; and
   a bottom pan receiving the receiving container and having projecting plugs each having a substantially curved shape portion receivable into the sockets.

2. The liquid crystal display device of claim 1, wherein the sockets each have a diameter corresponding to the curved shape portion of the projecting plugs.

3. The liquid crystal display device of claim 1, wherein the sockets are formed at corners of the bottom plate of the receiving container.

4. The display apparatus of claim 2, wherein the sockets each have a curved shape corresponding to the curved shape portion of the projecting plugs.

* * * * *